Figures 1, 2:
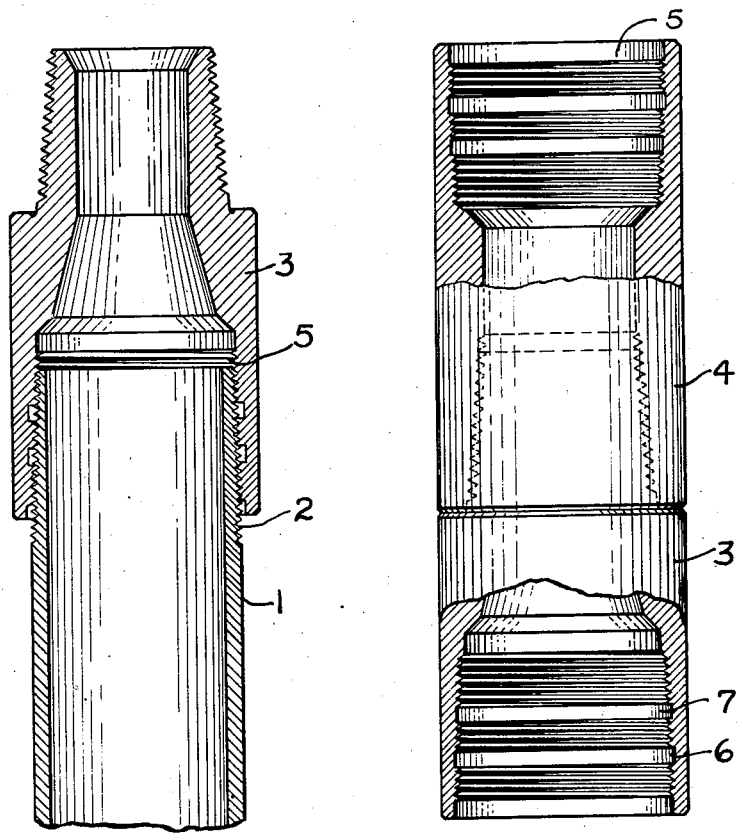

March 5, 1935.  I. H. BETTIS  1,993,257

INTERRUPTED TOOL JOINT PIPE THREAD

Filed Aug. 31, 1931

I. H. BETTIS INVENTOR

BY Jesse R. Stone

ATTORNEY

Patented Mar. 5, 1935

1,993,257

UNITED STATES PATENT OFFICE 1,993,257

INTERRUPTED TOOL JOINT PIPE THREAD

Irvin H. Bettis, Houston, Tex., assignor to Hughes Tool Company, Houston, Tex., a corporation of Texas Application August 31, 1931, Serial No. 560,256

5 Claims. (Cl. 285—146)

My invention relates to the formation of the pipe threads in the outer sockets of tool joint pins and boxes.

The two members, that is, the pin and the box members, of a tool joint are secured to the ends of the pipe sections by a thread of slight taper and fine pitch. When the pipe sections are thus connected with the tool joint members they are screwed together tightly so that no leakage may occur at the connection. The tight connection is usually made by the use of pipe screwing machines which buck the pipe into the joint under high torque, so as to assure a seal. Also, in drilling operations, the high torsional strain upon the pipe tends to still further force the threaded connection closely together.

When such a connection is made, it is found that the tapered end of the pipe in the threaded socket of the tool joint is wedged so tightly as to force the threads frictionally together, and also the hoop tension of the pipe in the socket also exerts a strain upon the joint and the pipe which slightly distorts the pipe. There is a swell in the joint about one and one-half (1½") inches from the end and galling of the threads at that point is most marked. The maximum compression of the pipe is at the end. Also, there is an elongation of the threaded end of the pipe.

When the tool joints are thus secured to the pipe sections, they cannot be easily released due to the galling of the threads and when they are released, the pipe ends must be re-threaded if the pipe is to be used again, and the sockets of the tool joints are also liable to mutilation.

It is an object of the invention to so form the threads upon the tool joint socket that they will not be materially mutilated in use. I desire to be able to screw the pipe sections tightly into the tool joint sockets as is now the custom and still prevent galling and mutilation of the threads; thus making a better seal at the joint and also preventing the ruining of the threaded end of the pipe after one use.

I aim to distribute the strain of the connection along several areas rather than upon one, and make several tight places instead of one, so that the strain will not be excessive at any one point.

In the drawing herewith, Fig. 1 is a central vertical section through a pipe end screwed within the socket end of a tool joint member formed in accordance with my invention.

Fig. 2 is a side view, partly in section of a tool joint with the sockets formed to carry out the invention.

The pipe section 1 may be threaded as usual with a slightly tapered and comparatively fine pitched thread 2.

The tool joint members include the pin member 3 and the box member 4, each of which has a threaded socket 5 to receive the ends of the pipe sections. The socket 5 is formed, in my preferred form, with a threaded area to be engaged by the pipe. I then recess the threaded area, as shown at 6 and 7 in one or in a plurality of annular zones.

The relief thus provided at these unthreaded areas allows a freedom from strain upon the pipe and instead of one area upon which expansion and swelling of the pipe may occur, this strain is distributed and is in no place excessive so as to gall the threads.

I find that joints of this design will be as tight at about three turns as are joints of the old design at five or six turns. Thus, as the threads are on a taper, the pipe and joints of this design are deformed when tight less than are pipe and the old type joints.

I also find that the pipe will screw into the socket of the joint with a fewer number of turns and when thus screwed tightly, there is a close seal. The threads are not mismated nor galled and no material mutilation or deformation of the threads upon the pipe occurs. The mating threads appear to have a more perfect contact over a greater length of thread, thus creating a greater frictional resistance, and making a tighter joint. Thus the threads are not destroyed and may be unscrewed and new tool joints substituted for the old without loss.

What I claim as new is:

1. A rotary tool joint for drill stems comprising pin and box members, pipe receiving sockets in the remote ends of said members, said sockets being threaded with a tapered fine pitched thread relieved at a plurality of spaced zones by recessed unthreaded areas which when said drill stem sections are screwed therein, will provide cavities into which the threads on said stem may expand.

2. A rotary tool joint for drill stems comprising pin and box members, pipe receiving sockets in the remote ends of said members, said sockets being tapered slightly and threaded to receive a pipe, the threaded area having at an intermediate point spaced from the ends of said socket an annular recessed area out of contact with the pipe when said pipe is screwed within said socket.

3. A tool joint having a tapered threaded socket to receive the end of a pipe, the thread in said socket being interrupted at spaced intervals and the socket recessed to provide vacant open chambers in said socket into which the threads on the pipe may expand to avoid mutilation of said threads.

4. A rotary tool joint for drill stems including coarsely threaded box and pin members adapted for connection together, pipe receiving sockets at the remote ends of said members, threads cut in said sockets of fine pitch, said threads being interrupted at spaced intervals between the ends of said sockets to leave a plurality of clear unthreaded recessed areas, to allow for expansion of the threads in engagement with said pipe.

5. In a drill stem employed in transmitting a rotary torque in well drilling, pipe sections, couplings connecting said sections, said couplings having a tapered socket to receive the end of a pipe section, said socket having a thread interrupted at spaced intervals to leave an annular recessed unthreaded area into which the threads can expand when said pipe section is screwed tightly into said socket.

IRVIN H. BETTIS.